(12) United States Patent
Hong

(10) Patent No.: US 7,445,223 B2
(45) Date of Patent: Nov. 4, 2008

(54) BICYCLE DRIVE UNIT CAPABLE OF BACKWARD MOVEMENT AND NAUGHTROTATION AND FORWARD MOVEMENT TRAVELING WHEN RECTITUDE OR REVERSE PEDALING

(76) Inventor: Jae Ho Hong, 21-203 Jogong Apt. 32, Goean-Dong, Sosa-Gu, Bucheon-Si, Gyeonggi-Do (KR)

( * ) Notice: Subject to any disclaimer, the term of this patent is extended or adjusted under 35 U.S.C. 154(b) by 569 days.

(21) Appl. No.: 10/553,463

(22) PCT Filed: May 13, 2004

(86) PCT No.: PCT/KR2004/001129

§ 371 (c)(1),
(2), (4) Date: Oct. 17, 2005

(87) PCT Pub. No.: WO2004/101353

PCT Pub. Date: Nov. 25, 2004

(65) Prior Publication Data

US 2007/0004545 A1   Jan. 4, 2007

(30) Foreign Application Priority Data

May 13, 2003   (KR) ...................... 10-2003-0030409

(51) Int. Cl.
*B62M 1/02* (2006.01)
(52) U.S. Cl. ........................ 280/260; 280/259; 280/253; 280/257; 280/255; 475/297; 475/289; 475/296; 475/312

(58) Field of Classification Search ................. 280/260, 280/259, 253, 257, 255; 475/297, 289, 296, 475/312
See application file for complete search history.

(56) References Cited

U.S. PATENT DOCUMENTS

| 3,842,691 | A | * | 10/1974 | Shea ........................... 475/290 |
| 4,371,185 | A | | 2/1983 | Bals |
| 4,559,848 | A | * | 12/1985 | Kerr ........................... 475/276 |
| 4,571,219 | A | | 2/1986 | Breden et al. |
| 4,603,754 | A | | 8/1986 | Matsutoh et al. |
| 4,721,015 | A | * | 1/1988 | Hartmann ................... 475/277 |
| 4,858,494 | A | * | 8/1989 | Healy .......................... 475/266 |
| 5,046,596 | A | | 9/1991 | Dennert |

(Continued)

*Primary Examiner*—Lesley D. Morris
*Assistant Examiner*—Marlon A Arce Diaz
(74) *Attorney, Agent, or Firm*—IPLA P.A.; James E. Bame

(57) ABSTRACT

The present invention relates to a bicycle drive unit that moves forward and backward and idles upon clockwise and counterclockwise pedaling, comprising: a drive shaft having one end located in an inner bearings of an internal bearing housing integrally formed with a rotary plate and the other end fixed to a clockwise one-way clutch and the inner wheel of a counterclockwise one-way clutch by means of a sunk key; a counterclockwise one-way clutch having a central gear press-fitted on its outer wheel; a ring gear engaged with the turnabout gear; a gear flange connected to a ring gear by means of a locking screw; a bearing housing of a dual structure consisting of an outer bearing housing having outer bearings; a brace attached to the outer circumference of the outer bearing housing by means of the locking screw; a detent pin unit for curving the internal bearing housing and the rotary plate; and a bicycle backward movement control unit having a hand lever and a detent latch.

2 Claims, 5 Drawing Sheets

U.S. PATENT DOCUMENTS

| | | | |
|---|---|---|---|
| 5,322,487 A * | 6/1994 | Nagano | 475/297 |
| 5,800,302 A | 9/1998 | Werre | |
| 6,048,287 A * | 4/2000 | Rohloff | 475/297 |
| 6,390,487 B1 * | 5/2002 | Yoo | 280/237 |
| 6,419,252 B1 * | 7/2002 | Park et al. | 280/237 |
| 6,852,060 B1 * | 2/2005 | Ash | 475/296 |
| 2005/0173889 A1 * | 8/2005 | Matsumoto et al. | 280/260 |
| 2005/0217914 A1 * | 10/2005 | Sugimoto | 180/205 |

* cited by examiner

BICYCLE DRIVE UNIT CAPABLE OF BACKWARD MOVEMENT AND NAUGHTROTATION AND FORWARD MOVEMENT TRAVELING WHEN RECTITUDE OR REVERSE PEDALING

TECHNICAL FIELD

The present invention relates to a bicycle drive unit. More particularly, the present invention relates to a bicycle drive unit wherein a bicycle moves forward when pedals are stepped on backward as well as when the pedals are stepped on forward, and the bicycle moves forward and backward or idles upon clockwise and counterclockwise pedaling.

BACKGROUND ART

A bicycle is usually driven by means of clockwise pedaling. Thus, a driver has to keep a certain posture for a long time while driving the bicycle. Further, leg muscles are concentrated used in a single direction. This makes its exercise effect reduced in terms of the quantity of motion and a feeling of fatigue increased.

Moreover, in case of a slope, although the weight of a driver is inclined behind, the pedaling must move in the clockwise direction. This males the driver feel tired as higher as several times than a flat. Accordingly, there are problems in that lots of load is applied to the leg and the driver loses interest in riding the bicycle.

DISCLOSURE OF INVENTION

Accordingly, the present invention has been made in view of the above problems, and it is an object of the present invention to provide a bicycle drive unit that can move forward and backward and idle upon clockwise and counterclockwise pedaling, wherein when the bicycle moves forward by means of front and rear two-way pedaling in such a way to use muscles uniformly, whereby the quantity of motion increases, a feeling of fatigue reduces and the bicycle can move with less force on a slope, etc.

In order to accomplish the above objects, there is provided a bicycle drive unit, comprising: a drive shaft having one end located in an inner bearings of an internal bearing housing integrally formed with a rotary plate and the other end fixed to a clockwise one-way clutch and the inner wheel of a counterclockwise one-way clutch by means of a sunk key; a counterclockwise one-way clutch having a central gear press-fitted on its outer wheel, wherein a plurality of turnabout gears engaged with the central gear are coupled to the rotary plate by means of a fixed pin; a ring gear engaged with the turnabout gear and having a chain sprocket attached on its outer circumference; a flange connected to a ring gear by means of a locking screw and having an inner circumference press-fitted into the outer wheel of the clockwise one-way clutch; a bearing housing of a dual structure consisting of an outer bearing housing having outer bearings, wherein the outer bearings are rotated together with the internal bearing housing in a backward movement; a brace attached to the outer circumference of the outer bearing housing by means of the locking screw; a detent pin unit for curving the internal bearing housing and the rotary plate, wherein the detent pins within the detent pin guide is introduced into the detent plate attached to the internal bearing housing by means of the return spring as the hand lever is relaxed; and a bicycle backward movement control unit having a hand lever and a detent latch, wherein the hand lever is connected to the detent pins by means of a steel wire and is fixed to a steering handle tube by means of a clamp, and the detent latch is attached to the hand lever.

According to the present invention, the detent plate is machined into the rotary plate with a plurality of detent grooves included therein, the brace is attached to the outer circumference of the outer bearing housing by means of the locking screw so that the detent pins is inserted into the detent grooves, and the return spring assembled to the brace is located in the direction of the rotary plate.

BRIEF DESCRIPTION OF DRAWINGS

Further objects and advantages of the invention can be more fully understood from the following detailed description taken in conjunction with the accompanying drawings in which:

FIG. 2 is a detailed view of the bicycle drive unit shown in FIG. 1;

BEST MODE FOR CARRYING OUT THE INVENTION

The present invention will now be described in detail in connection with preferred embodiments with reference to the accompanying drawings.

Figure 1:
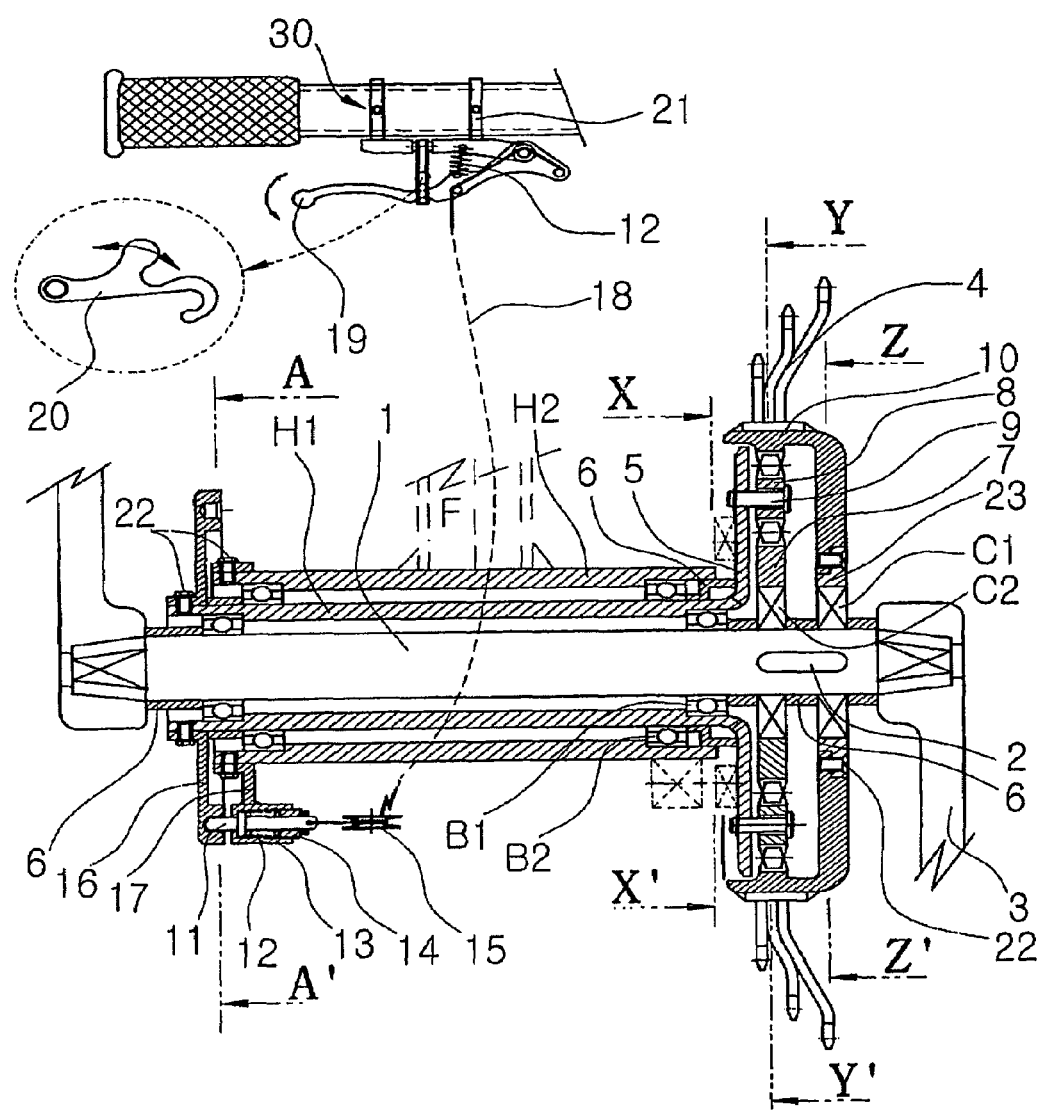
FIG. 1 is a cross-sectional view showing a bicycle drive unit according to an embodiment of the present invention.

FIG. 1 is a cross-sectional view showing a bicycle drive unit according to an embodiment of the present invention. FIG. 2 is a detailed view of the bicycle drive unit shown in FIG. 1.

Referring to FIGS. 1 and 2, in a common bicycle in which pedals are stepped on to drive the rear wheel of the bicycle and the bicycle is moved forward, a bicycle drive unit according to the present invention is constructed in such a manner that a drive shaft 1 having a pedal crank 3 connected thereto is rotated to transfer the power source to a driving chain connected to a chain sprocket 4, whereby the bicycle's rear wheel is rotated in the clockwise direction to move the bicycle forward.

In the above, the drive shaft 1 is inserted into one side of the inner wheel of inner bearings B1 within an internal bearing housing H1 integrally formed with a rotary plate 5. On the other side of the inner wheel of inner bearings B1, a counterclockwise one-way clutch C2 and the inner wheel of a clockwise one-way clutch C1 are fixed by means of a sunk key 2 on the drive shaft 1.

In the above, the counterclockwise one-way clutch C2 is a common one-way clutch. That is, if the inner wheel is rotated in the counterclockwise direction, the rotational force is transferred to the outer wheel. If the outer wheel is rotated in the counterclockwise direction and the inner wheel is in the clockwise direction, the rotational force is not transferred to the outer wheel but only the inner wheel idles. At this time, the outer wheel itself can idle in the counterclockwise direction.

Furthermore, the clockwise one-way clutch C1 is a common one-way clutch. That is, if the inner wheel is rotated in the clockwise direction, the rotational force is transferred to the outer wheel and the outer wheel is rotated in the clockwise direction. If the inner wheel is rotated in the counterclockwise direction, the rotational force is not transferred to the outer wheel but only the inner wheel idles. At this time, the outer wheel itself can idle in the clockwise direction.

At this time, the inner wheel of a central gear 7 is press-fitted into the outer wheel of the counterclockwise one-way clutch C2.

Figure 2A:
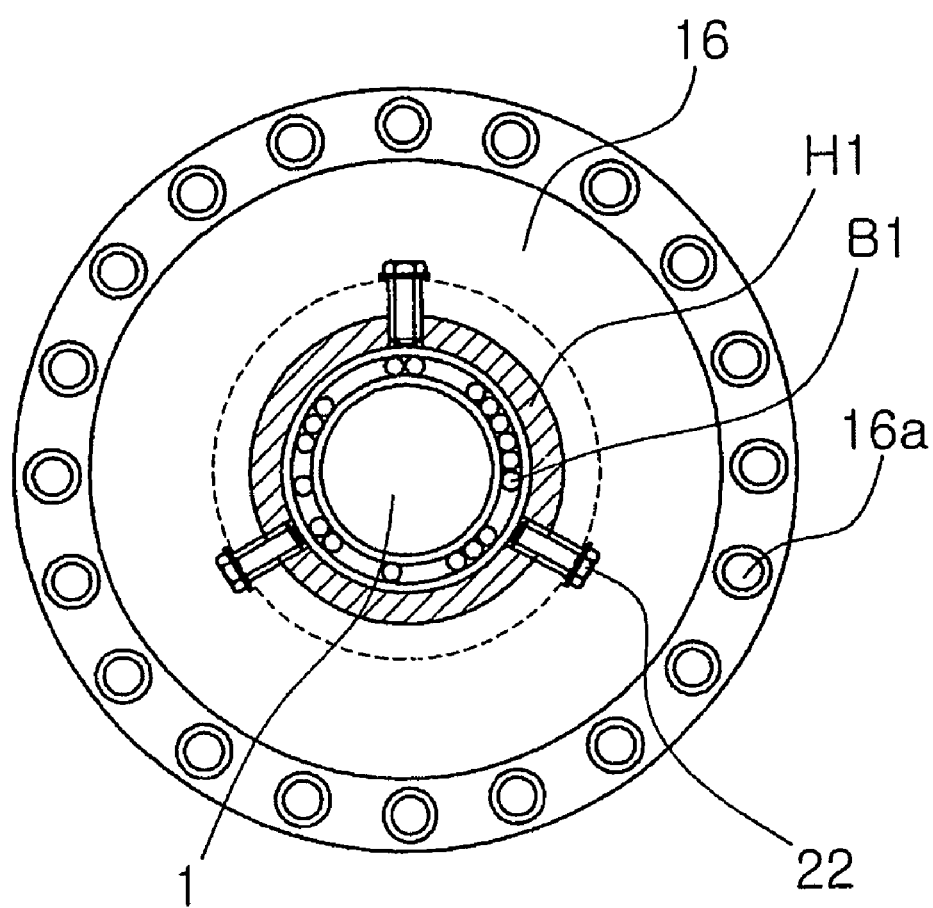
FIG. 2a is a cross-sectional view of the bicycle drive unit taken along lines A-A in FIG. 1.
Figure 2B:
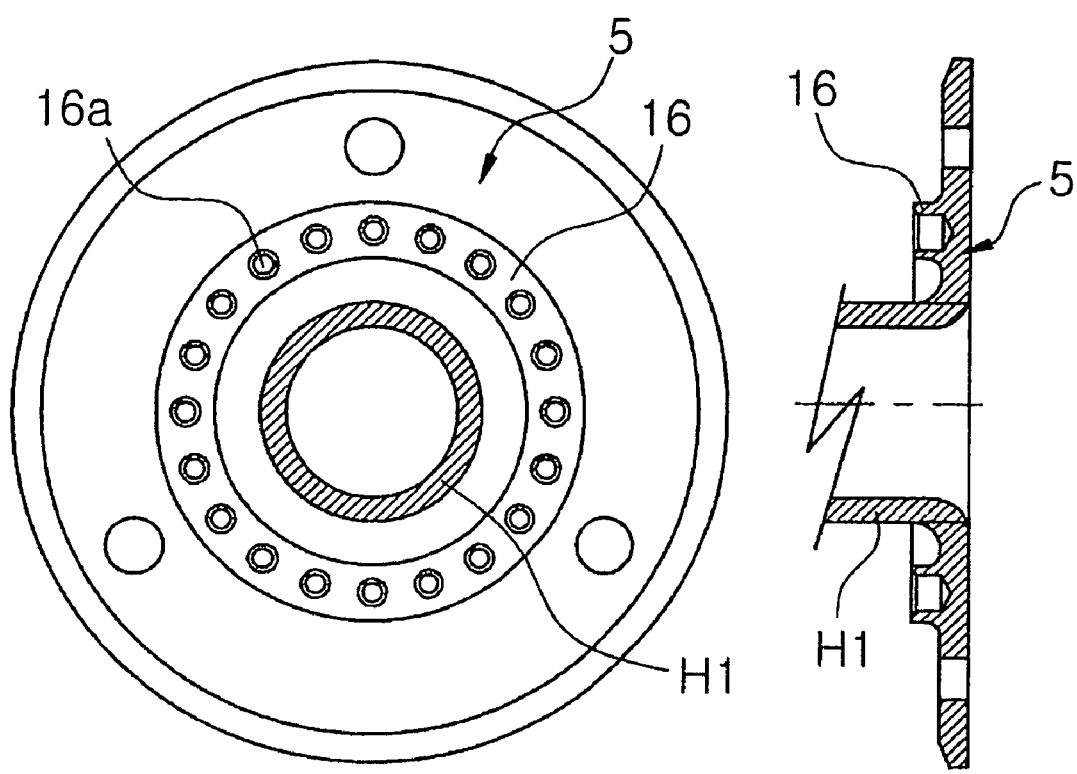
FIG. 2b is a cross-sectional view of the bicycle drive unit taken along lines X-X' in FIG. 1.
Figure 2C:
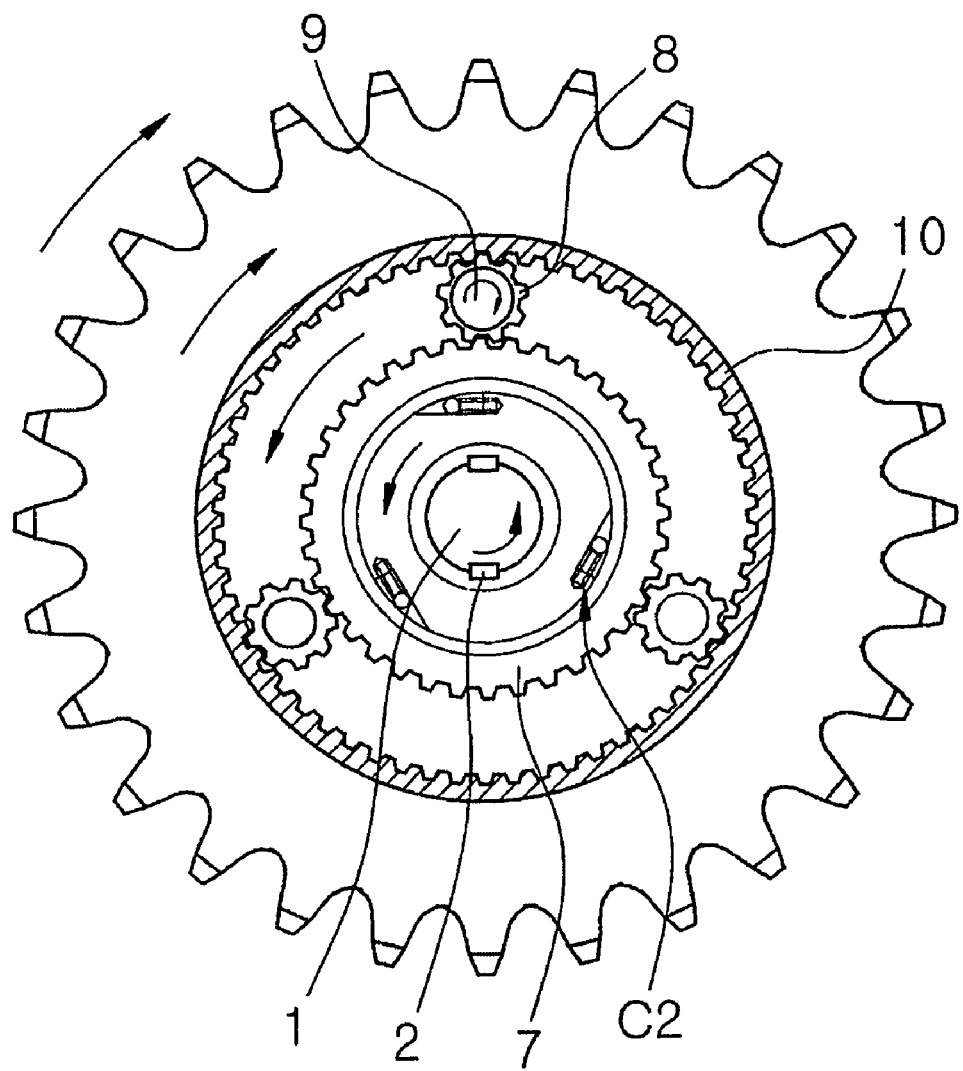
FIG. 2c is a cross-sectional view of the bicycle drive unit taken along lines Y-Y' in FIG. 1.

Referring to FIG. 2c, each of three or four turnabout gears 8 has teeth saws formed in equal distance on its surface. The teeth saws of the gears 8 are rotatably engaged with the teeth saws of the central gear 7. Each turnabout gear 8 is coupled to the rotary plate 5 by means of a fixed pin 9.

Figure 2D:
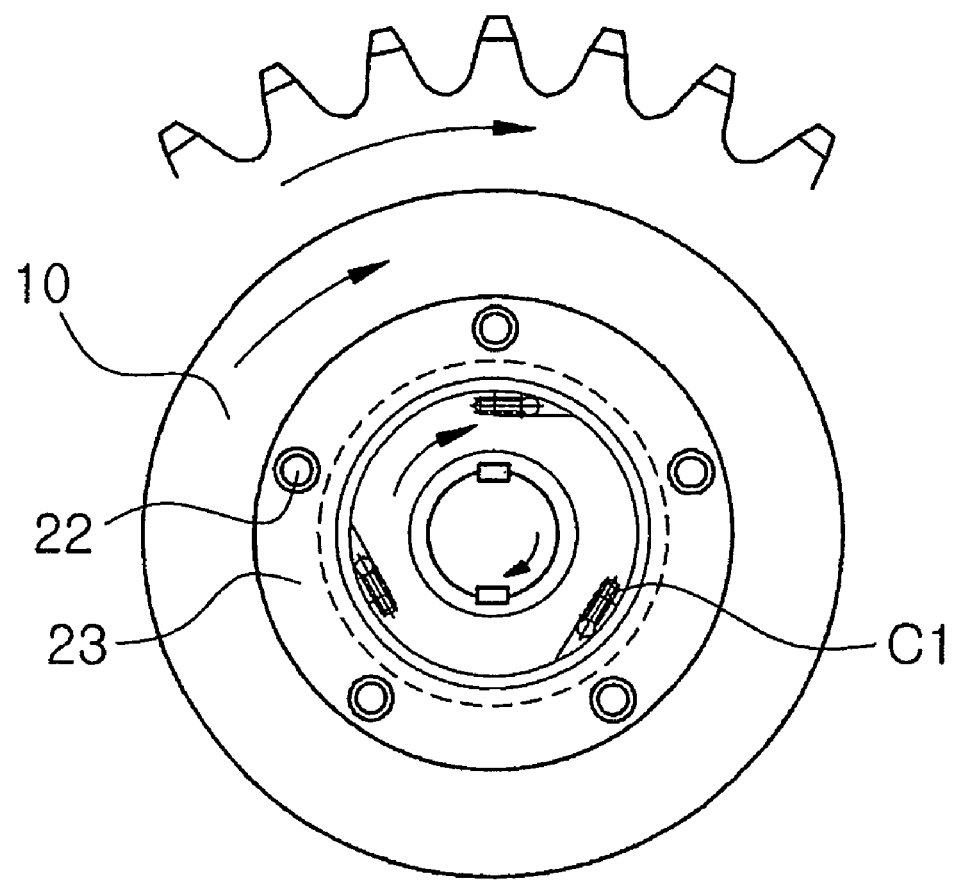
FIG. 2d is a cross-sectional view of the bicycle drive unit taken along lines Z-Z' in FIG. 1.

The ring gear 10 having the chain sprocket 4 attached thereto is coupled to the outer circumference of the turnabout gear 8. The ring gear 10 is coupled by means of a flange 23 and a locking screw 22 both of which are press-fitted to the outer wheel of the clockwise one-way clutch C1, as shown in FIG. 2d.

In this construction, the outer circumference of the internal bearing housing H1 is inserted into the inner wheel of the outer bearings B2 within the outer bearing housing H2 fixed to the bicycle frame F. Thus, respective components are located on the same axis in association with the rotary plate 5 and the drive shaft 1.

Through this construction, if the pedal crank 3 is rotated in the clockwise direction to rotate the drive shaft 1 in the clockwise direction, the inner wheel of the clockwise one-way clutch C1 is rotated in the clockwise direction. At this time, the rotational force is transferred to the outer wheel and the outer wheel is thus rotated in the clockwise direction.

The rotational force of the clockwise direction rotates the ring gear 10 to which the chain sprocket 4 coupled by the flange 23 and the locking screw 22 is attached in the clockwise direction, thus making the bicycle moving forward. The inner wheel of the counterclockwise one-way clutch C2 coupled to the same drive shaft 1 by means of the sunk keys 2 is rotated in the clockwise direction. When the inner wheel is rotated in the clockwise direction, however, the outer wheel is not applied with the rotational force but idles.

Therefore, the rotational force is not transferred to the central gear 7. In addition, when the ring gear 10 is rotated in the clockwise direction, the turnabout gear 8 is rotated in the clockwise direction since the teeth saws on the outer circumference of the turnabout gear 8 and the teeth saws on the inner circumference of the ring gear 10 are engaged with each other. The central gear 7 engaged with the turnabout gear 8 is rotated in the counterclockwise direction.

The central gear 7 that rotates in the counterclockwise direction and the outer wheel of the counterclockwise one-way clutch C2 are press-fitted and coupled. Thus, the outer wheel itself idles when it rotates in the counterclockwise direction against the inner wheel. As a result, as the outer wheel and the inner wheel idle to each other in the opposite direction, there is nothing interference in structure.

Moreover, if the pedals are turned and stepped on to rotate the pedal crank 3 in the counterclockwise direction and the drive shaft 1 is rotated in the counterclockwise direction, the inner wheel of the counterclockwise one-way clutch C2 is rotated in the counterclockwise direction. The outer wheel to which the rotational force is transferred and the central gear 7 coupled to the outer wheel are rotated in the counterclockwise direction. The turnabout gear 8 engaged with the central gear 7 has it rotational direction changed and rotates in the clockwise direction. At this time, the rotational direction is transferred to the inner circumference of the ring gear 10, making the ring gear 10 to which the chain sprocket 4 is attached rotating in the clockwise direction. Thereby, the bicycle moves forward.

At this time, the outer wheel of the clockwise one-way clutch C1 attached on the same axis is rotated in the clockwise direction together with the ring gear 10. However, the outer wheel of the clockwise one-way clutch C1 idles against the inner wheel. The inner wheel of the clockwise one-way clutch C1 also idles along with the drive shaft 1 in the counterclockwise direction. As a result, as the outer wheel and the inner wheel idle in the opposite direction to each other, there is nothing interference.

As such, if an epicyclic gear structure is positioned on the part of the counterclockwise one-way clutch C2 considering characteristics of both the one-way clutches C1 and C2, the output is always rotated in the clockwise direction regardless of the rotational direction of the pedals though the pedals are stepped forward or backward. Thus the bicycle moves forward.

As described above, both the counterclockwise one-way clutch C2 and the clockwise one-way clutch C1 are positioned on the same drive shaft 1 and the output is always rotated in the clockwise direction. Thus, when the bicycle is pulled backward in order to make the bicycle move backward, the ring gear 10 itself to which the chain sprocket 4 is attached cannot be rotated in the counterclockwise direction in order to change the output. As a result, the bicycle does not move backward.

As shown in FIGS. 1 and 2a, however, a detent plate 16 having a plurality of groove into which the detent pins 11 are inserted formed therein are attached to the outer circumference of one side of the internal bearing housing H1 or the outer surface of the rotary plate as shown in FIG. 2b by means of a locking screw 22. The detent pins 16 is moved back on the outer circumference of the outer bearing housing H2 by means of the steel wire 18 through the roller 15 when the hand lever 19 is grasped. When the bicycle moves backward, if it is desired to rotate the ring gear 10 having the chain sprocket 4 attached thereto in the counterclockwise direction by means of the chain's tension by the rotation of the rear wheel, the internal bearing housing H1 inserted into the inner wheel of the outer bearings B2 of the outer bearing housing H2, the rotary plate 5 integrally formed with the internal bearing housing H1, the drive shaft 1, both the one-way clutches C1 and C2 and the epicyclic gear unit are integrated in their operation. Thus, as they are rotated in the counterclockwise direction along with the chain sprocket 4, the bicycle is moved backward.

Furthermore, when the hand lever 19 is released, the detent pins 11 within the detent pin guide 13 is moved forward into one of the plurality of the detent grooves 16a of the detent plate 16 by means of the return spring 12, thus prohibiting the internal bearing housing H1 and the rotary plate 5 forming moving. Therefore, clockwise and counterclockwise pedaling is normally possible. In the above, the spring control screw 14 is used to control the tension of the spring.

The hand lever 19 is fastened to a common bicycle steering handle tube 30 by means of a clamp 21. The detent latch 20 is attached to the hand lever 19. Thus, when the bicycle is moved backward a little far, the bicycle can be used in such a manner that the hand lever 19 is grasped and the detent latch 20 is pushed out and pressed so that the hand lever 19 does not return by means of the return spring 12.

In common backward movement, the bicycle steering handle is pulled back with the hand lever 19 held.

Moreover, the detent pins 11 are used by attaching a brace 17 to one end of the outer bearing housing H2 that is permanently attached to the bicycle frame F or one end of the rotary plate 5 by means of the locking screw 22. Therefore, in backward movement, by holding or releasing the hand lever 19, the internal bearing housing H1 within the bearing housing of a dual structure can be rotated in the counterclockwise direction or stopped.

INDUSTRIAL APPLICABILITY

According to the present invention as described above, the bicycle is run using pedaling of the clockwise direction or the counterclockwise direction. Therefore, the present invention has effects that it reduces a feeling of fatigue, increases the quantity of motion, and allows a user to enjoy riding a bicycle with more interest.

Furthermore, an additional device/unit for backward movement is mounted in a bicycle. There is an effect in that a backward movement problem of clockwise and counterclockwise devices outputted only in one direction can be solved with low price without increased cost.

What is claimed is:

1. A bicycle drive unit that moves forward and backward and idles upon clockwise and counterclockwise pedaling, comprising:
   a drive shaft 1 having one end located in an inner bearings B1 of an internal bearing housing H1 integrally formed with a rotary plate 5 and the other end fixed to a clockwise one-way clutch C1 and the inner wheel of a counterclockwise one-way clutch C2 by means of a sunk key 2;
   a counterclockwise one-way clutch C2 having a central gear 7 press-fitted on its outer wheel, wherein a plurality of turnabout gears 8 engaged with the central gear 7 are coupled to the rotary plate 5 by means of a fixed pin 9;
   a ring gear 10 engaged with the turnabout gear 8 and having a chain sprocket 4 attached on its outer circumference;
   a flange 23 connected to a ring gear 10 by means of a locking screw 22 and having an inner circumference press-fitted into the outer wheel of the clockwise one-way clutch C1;
   a bearing housing of a dual structure consisting of an outer bearing housing H2 having outer bearings B2, wherein the outer bearings B2 are rotated together with the internal bearing housing H1 in a backward movement;
   a brace 17 attached to the outer circumference of the outer bearing housing B2 by means of the locking screw 22;
   a detent pin unit for curving the internal bearing housing H1 and the rotary plate 5, wherein the detent pins 11 within the detent pin guide 13 is introduced into the detent plate 16 attached to the internal bearing housing H1 by means of the return spring 12 as the hand lever 19 is relaxed; and
   a bicycle backward movement control unit having a hand lever 19 and a detent latch 20, wherein the hand lever 19 is connected to the detent pins 11 by means of a steel wire 18 and is fixed to a steering handle tube 30 by means of a clamp 21, and the detent latch 20 is attached to the hand lever 19.

2. The bicycle drive unit as claimed in claim 1, wherein the detent plate 16 is machined into the rotary plate 5 with a plurality of detent grooves 16*a* included therein,
   the brace 17 is attached to the outer circumference of the outer bearing housing H2 by means of the locking screw 22 so that the detent pins 11 is inserted into the detent grooves 16*a*, and
   the return spring 12 assembled to the brace 17 is located in the direction of the rotary plate 5.

* * * * *